(12) United States Patent
Lin et al.

(10) Patent No.: US 7,815,264 B2
(45) Date of Patent: Oct. 19, 2010

(54) STACKABLE MODULAR PERSONAL COMPUTER STRUCTURE

(75) Inventors: Te-An Lin, Taipei Hsien (TW);
Chih-Hsiung Chen, Taipei Hsien (TW);
Wu-Nan Wang, Taipei Hsien (TW);
Cheng Tu, Taipei Hsien (TW);
Ching-Tang Lin, Taipei Hsien (TW)

(73) Assignee: Aopen Inc., Hsichi, Taipei Hsien (TW)

( * ) Notice: Subject to any disclaimer, the term of this patent is extended or adjusted under 35 U.S.C. 154(b) by 464 days.

(21) Appl. No.: 11/705,041

(22) Filed: Feb. 12, 2007

(65) Prior Publication Data

US 2008/0002346 A1   Jan. 3, 2008

(30) Foreign Application Priority Data

Mar. 27, 2006   (TW)   ............................. 95110580 A

(51) Int. Cl.
  *A47B 81/00*   (2006.01)
(52) U.S. Cl. ..................................... 312/223.2; 312/108
(58) Field of Classification Search ................ 312/108, 312/107, 111, 257.1, 223.1, 223.2; 361/679.01, 361/679.02, 724–727; 220/4.27, 4.26, 23.83, 220/23.86, 23.88, 23.89; 206/501, 509, 511, 206/514; 211/26, 126.12, 188, 194; 174/50, 174/559
See application file for complete search history.

(56) References Cited

U.S. PATENT DOCUMENTS

| | | | | |
|---|---|---|---|---|
| 3,918,781 | A * | 11/1975 | Paris ............................ | 312/111 |
| 4,941,841 | A * | 7/1990 | Darden et al. ........... | 361/679.39 |
| 5,318,182 | A * | 6/1994 | Thorud et al. ................ | 206/509 |
| 5,492,399 | A * | 2/1996 | Tillack ........................ | 312/111 |
| 5,515,239 | A * | 5/1996 | Kamerman et al. .......... | 361/727 |
| 5,519,572 | A * | 5/1996 | Luo ......................... | 361/679.23 |
| 5,544,751 | A * | 8/1996 | Klodt et al. .................. | 206/509 |
| 5,630,658 | A * | 5/1997 | Jeter ........................... | 312/107 |
| 5,808,871 | A * | 9/1998 | Rosecan et al. .............. | 361/730 |
| 5,810,459 | A * | 9/1998 | Barrett et al. ................ | 312/111 |
| 5,913,926 | A * | 6/1999 | Anderson et al. ............... | 714/6 |
| 6,098,819 | A * | 8/2000 | Link ........................ | 211/85.13 |
| 6,442,021 | B1 * | 8/2002 | Bolognia et al. ........ | 361/679.34 |
| 6,698,851 | B1 * | 3/2004 | Ludl ........................... | 312/108 |
| 6,726,295 | B2 * | 4/2004 | Searby ..................... | 312/223.2 |
| 6,741,475 | B1 * | 5/2004 | Chuang et al. .............. | 361/727 |
| 6,834,920 | B2 * | 12/2004 | Landsberger et al. .... | 312/257.1 |

(Continued)

FOREIGN PATENT DOCUMENTS

CN   1095558 C   12/2002

(Continued)

*Primary Examiner*—Darnell M Jayne
*Assistant Examiner*—Andres Gallego

(57) ABSTRACT

A stackable modular personal computer structure comprises a lowermost frameworks, a plurality of intermediate frameworks, an uppermost framework and an upper cover; the frameworks and the upper cover stacked with each other in a sequence; all the frameworks have the first internal engaging structure inside the tops thereof respectively, the intermediate frameworks, the uppermost framework and the upper cover each have the second internal engaging structure inside the bottoms thereof respectively; the bottoms of each of the intermediate and the uppermost frameworks has a hole especially for electric wires to pass through to enable the modular personal computer so that a consistent outlook for the computer structure can be obtained.

7 Claims, 5 Drawing Sheets

U.S. PATENT DOCUMENTS

| | | | | |
|---|---|---|---|---|
| 7,124,896 | B2 * | 10/2006 | Cellini et al. | 211/26 |
| 7,529,096 | B2 * | 5/2009 | Lin et al. | 361/724 |
| 2004/0089618 | A1 * | 5/2004 | Lauchner et al. | 211/26 |
| 2006/0033407 | A1 * | 2/2006 | Su | 312/111 |

FOREIGN PATENT DOCUMENTS

| | | |
|---|---|---|
| DE | 3720099 A1 | 12/1987 |
| DE | 10322039 A1 | 12/2003 |
| TW | 261254 | 10/1995 |

* cited by examiner

STACKABLE MODULAR PERSONAL COMPUTER STRUCTURE

BACKGROUND OF THE INVENTION

1. Field of the Invention

The present invention relates to a personal computer, and more particularly to a multi-configuration stackable modular personal computer structure.

2. Description of the Prior Art

U.S. Pat. No. 6,118,663 discloses a multi-configuration modular computer; it comprises a display module, a keyboard and pointer device module, a motherboard and power module, a mass-storage module, and an expansion module. A user can stack and assemble different uses of devices such as a LCD displayer, a notebook computer and a desktop computer by selecting and combining different modules.

Taiwan Patent Publish No. 490,121 discloses a housing structure capable of integrating a modular computer comprising a plurality of cabin bodies. Elements such as semi-system cabin and a displayer cabin are installed in the cabin bodies. The semi-system cabin is constituted by a housing, an inner seat and a panel. A rear end of the housing has a hollow section to form a hollow connection space. A plurality of connection elements are installed in a suitable position of the housing. The inner seat is installed in the housing. A rear end of the inner seat has a hollow section corresponding to the hollow section of the housing to form a hollow connection space. The panel is combined with a front end of the inner seat. The displayer cabin includes a main display device and an outer frame which are mutually moveably connected. A plurality of connection elements are installed in a suitable peripheral position of the outer frame. There is a connecting wire space between the outer frame and the display device which is corresponding to the connecting wires space of other cabin. The semi-system cabin and the displayer cabin are combined with each other stably through the connection elements so as to allow all the cabins to have an identical length and width, and have corresponding spaces for providing various connecting wires and terminals to be disposed in a connection space at a rear side of each cabin.

According to the combination computer disclosed in the United States patent mentioned above, the communication between each two adjacent modules is done by means of male and female terminals and not by means of electric wires always used in a general assembled computer, the terminal in an upper layer module cannot be electrically connected to the terminal in a lower layer module by striding electric wires across intermediate modules.

According to the combination computer disclosed in the Taiwan patent mentioned above, a connection structure between each two layers and various electrical connection wires are all exposed in a hollow part at the rear end of the housing such that the outlook of the entire modeling is influenced.

SUMMARY OF THE INVENTION

For further allowing the wires and the combinational structure of each layer of the stackable modular personal computer to be hidden in the framework to attain a consistent outward appearance, the present invention is proposed.

The main object of the present invention is to provide a stackable modular personal computer structure allowing each framework to have an interlinked hole, the wires and the combinational structure of each layer of the stackable modular personal computer are hidden in the framework to attain a consistent outward appearance.

Another object of the present invention is to provide a stackable modular personal computer structure allowing each framework to be easily assembled and firmly combined.

A stackable modular personal computer according to the present invention is used for assembling an individualized computer, comprising a plurality of frameworks; the plural frameworks are stacked to combine with each other in a sequence; a top end of each framework provides a through hole for communicating with the framework disposed above; the plural frameworks include a first framework which is the lowest layer thereof; the bottoms of other frameworks above the first framework have a hole for allowing at least one electric wire to pass through to enable the electric wire to be routed to each framework. Therefore, the personal computer architecture shows a consistent outward appearance.

BRIEF DESCRIPTION OF THE DRAWINGS

The present invention can be more fully understood by reference to the following description and accompanying drawings, in which.

DETAILED DESCRIPTION OF THE INVENTION

Figure 1:
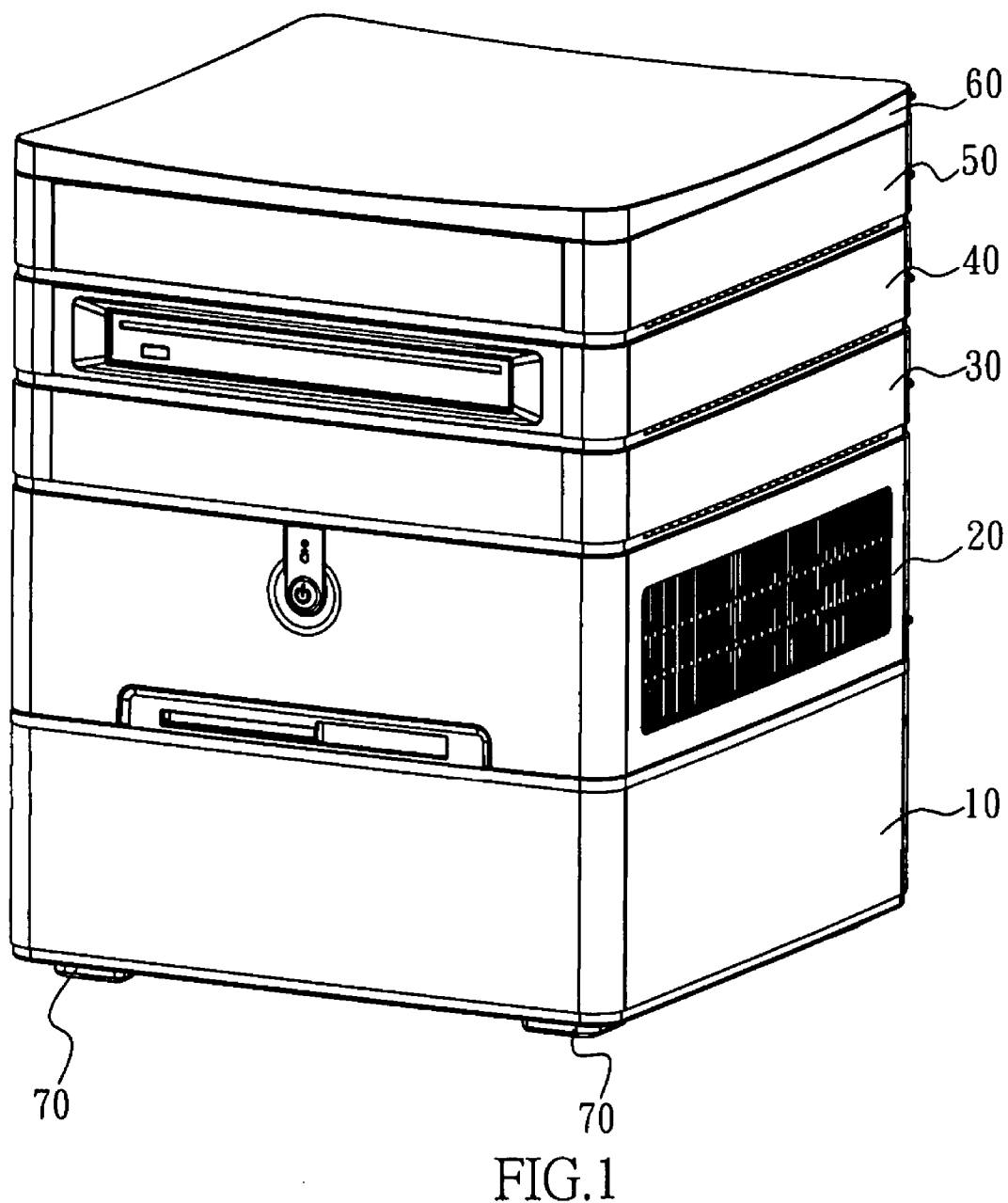
FIG. 1 is a schematic view, showing a framework of a preferred embodiment according to the present invention assembled in a stackable modular personal computer.
Figure 2:
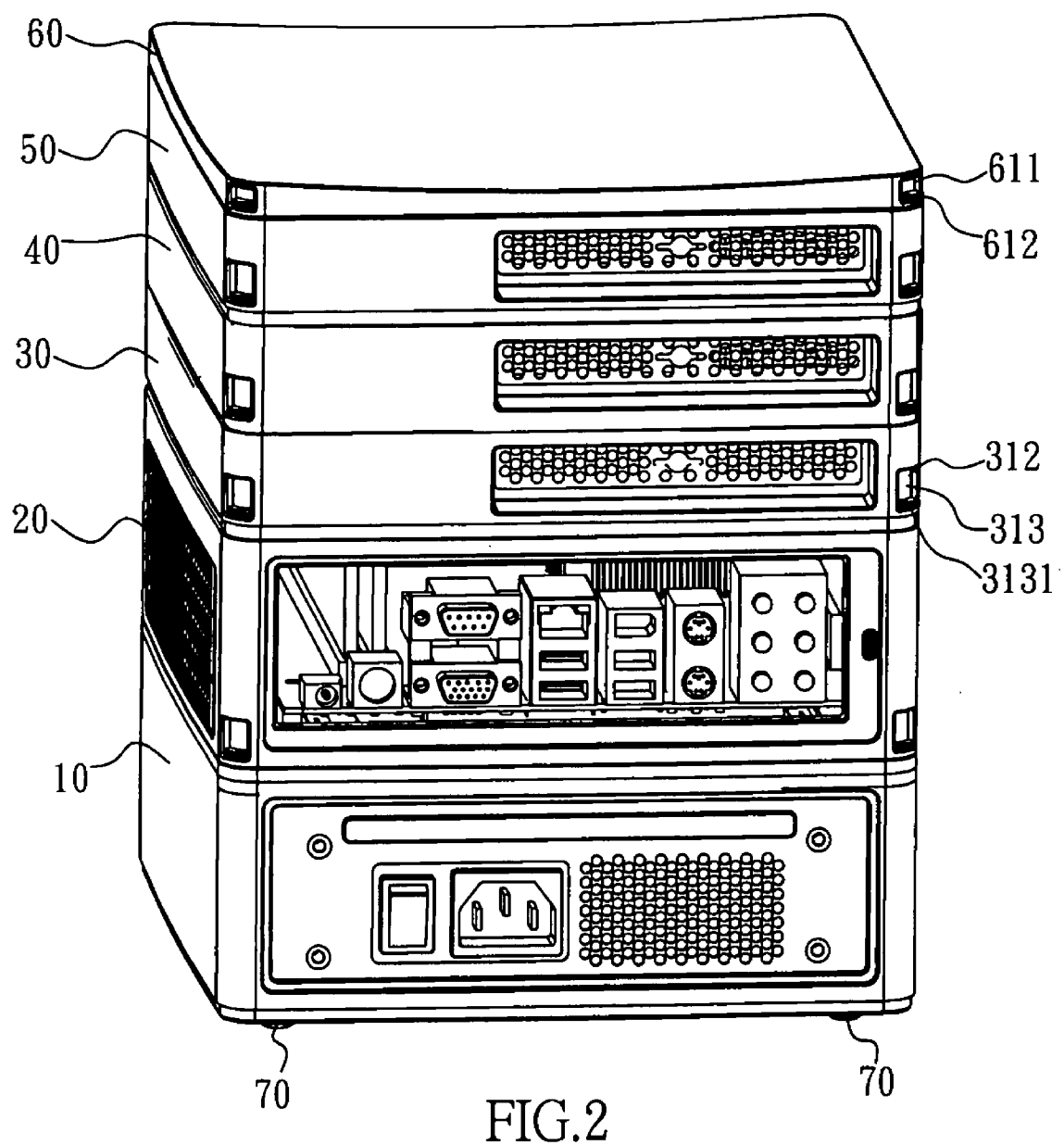
FIG. 2 is another schematic view, showing a framework of a preferred embodiment according to the present invention assembled in a stackable modular personal computer.

Please referring to FIGS. 1 and 2, a stackable modular personal computer structure of a preferred embodiment according to the present invention is used for assembling an individualized computer. The stackable modular personal computer structure comprises a first framework 10, a second framework 20, a third framework 30, a fourth framework 40, a fifth framework 50 and an upper cover 60 stacked to combine with each other in a sequence. The first framework 10 is disposed at the lowermost position. A downside of the first framework 10 is combined with a plurality of foot rests 70. The second, third and fourth frameworks 20, 30, 40 are disposed at the intermediate positions sequentially. The fifth framework 50 is disposed at the uppermost position. Each of the frameworks has an open top for communicating with the framework above.

Figures 3A, 3B:
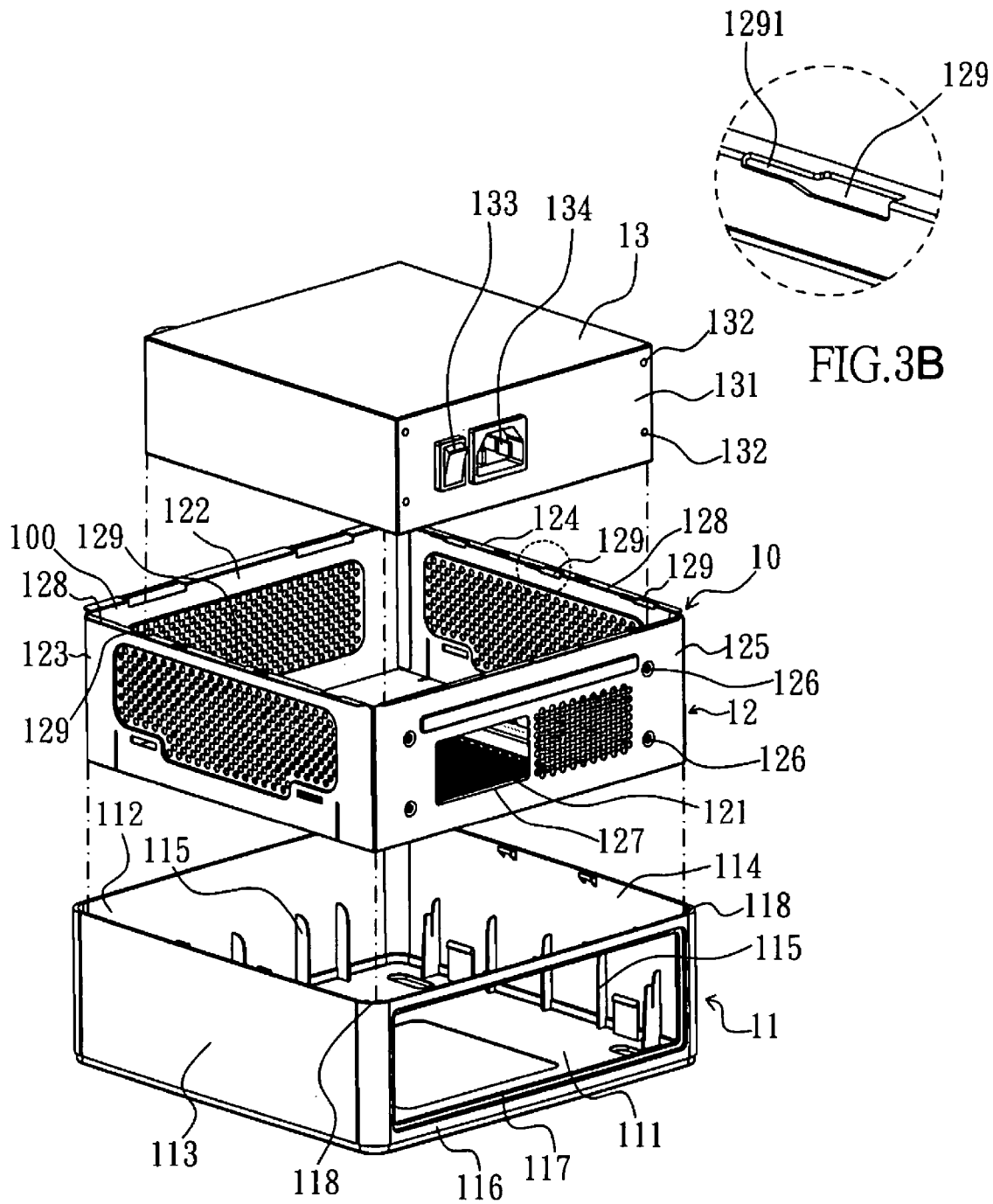
FIG. 3A is an exploded view, showing the first framework of a preferred embodiment according to the present invention.
FIG. 3B is an enlarged perspective view of the portion in the dashed circle in FIG. 3A.

Please referring to FIGS. 3A and 3B, the first framework 10 comprises a first inner frame 12 which is joined to an inner side of a first outer frame 11 for forming an internal engaging structure. The first outer and inner frames 11, 12 are provided with an open top. A power supply 13 is combined with an inner side of the first inner frame 12. A base 111 of the first outer frame 11 upholds the bottom 121 of the first inner frame 12. The inner sides of the front side 112, and two opposite lateral sides 113, 114 of the first outer frame 11 have a plurality of fins 115 respectively. The fins 115 are respectively propped against the front side 122, and the two opposite sides 123, 124 of the first inner frame 12. The upper sides of the junctions between the rear side 116 and the two opposite lateral sides 113, 114 have a slot 118 respectively. The rear side 131 of the power supply 13 has a plurality of screw holes 132. The rear side 125 of the first inner frame 12 has a plurality of holes 126 which correspond to the screw holes 132 such that the power supply 13 is joined to the rear side 125 of the first inner frame 12 with screws passing through the corresponding holes 126 and the screw holes 132. There is a space between the front side 122 of the first inner frame 12 and the power supply 13 to form a hollow space 100 for communicating with the framework 20 (not shown) and allowing electric wires to pass through. The rear side 125 of the first inner frame 12 and the rear side 116 of the outer frame provide a hole 117, 127 respectively which correspond to a connector 134 and a switch 133 of the power supply 13. The top ends of the two lateral sides 123,124 of the first inner frame 12 provide an outward bending prop-plate 128 for upholding the outer frame of the upper framework. The junctions of the prop-plates 128 with the two opposite lateral sides 123, 124 of the first inner frame 12 provide a plurality of clasp-holes 129 respectively. The front end of the clasp-hole 129 is narrow to form a crevice 1291. The rear end of the clasp-hole 129 is wider than the front end thereof.

Referring to FIGS. 1-5, the second framework 20, the third framework 30, the fourth framework 40 and the fifth framework 50 of the present invention provide an identical internal engaging structure at the inner sides of the tops thereof, and another identical internal engaging structure at the inner sides of the bottoms thereof. The third framework 30 is taken as an example to explain the internal engaging structures in the following paragraphs.

The third framework 30 includes a third inner frame 32 which is combined with an inner side of a third outer frame 31 The internal engaging structure inside the top of the third framework 31 is disposed at the third outer frame 31 and the third inner frame 32 and, approximately the same as the internal engaging structure at the first outer frame 11 and the first inner frame 12 as shown in FIG. 3. The upper and lower sides of the third framework 30 provide an open top and open bottom with a hollow space 310 which corresponds to the hollow space 100 of the first framework 10.

The upper end and lower end of the junctions between the rear side and the two opposite lateral sides of the third outer frame 31 have a first slot 311 and a second slot 312 respectively which correspond to the slot 118 of the first outer frame 11 as shown in FIG. 3A. The slot 312 extends to the bottom of the third outer frame 31. The slot 312 is movably combined with a clasp-plate 313. An ear-plate 3131 of the clasp-plate 313 is extended to an outside of the slot 312.

The top end of the two opposite lateral sides 321, 322 of the third inner frame 32 provides a prop-plate 323 and a clasp-hole 324 respectively which correspond to the outward-bending prop-plate 128 and the clasp-hole 129 of the two opposite lateral sides 123, 124 of the first inner frame 12 as shown in FIG. 3A. The prop-plate 323 is provided for supporting the outer frame of the fourth framework (not shown). The clasp-hole 324 is provided for fastening a clasp-ear of the bottom of an inner frame of the fourth framework.

The bottoms of the two opposite lateral sides 321,322 of the third inner frame 32 provide an outward extending clasp-ear 325 respectively. The clasp-ear 325 respectively corresponds to the wider area of the rear end of the clasp-hole 129 of the prop-plates 128 as shown in FIGS. 3A and 3B. The front end of the clasp-ear 325 provides a lug 3251. There is a gap between the lug 3251 and the two opposite lateral sides 321, 322 respectively. The lug 3251 and the left and right sides 321, 322 do not joint each other respectively.

When the clasp-ear 325 of the third inner frame 32 is placed on a wider part of a clasp-hole at a rear end of a second inner frame of the second framework 20, then makes the third inner frame 32 move forward, and then the lug 3251 of the clasp-ear 325 is fastened under a second prop-plate of the second framework 20 and is placed on an outside of a crevice of a clasp-hole of the second prop-plate, then pull back the ear-plate 3131 and drive the bottom of the clasp-plate 313 to extend under the slot 312 to be fastened in the second slot of the second outer frame of the second framework 20 (not shown), allowing the third outer frame 31 not to be moved backward and the clasp-ear 325 of the third inner frame 32 not to be detached from the clasp-hole of the second inner frame of the second framework 20 so as to cause the second framework 20 to be steadily fastened to the third framework 30 as shown in FIG. 2.

Figures 4A, 4B:
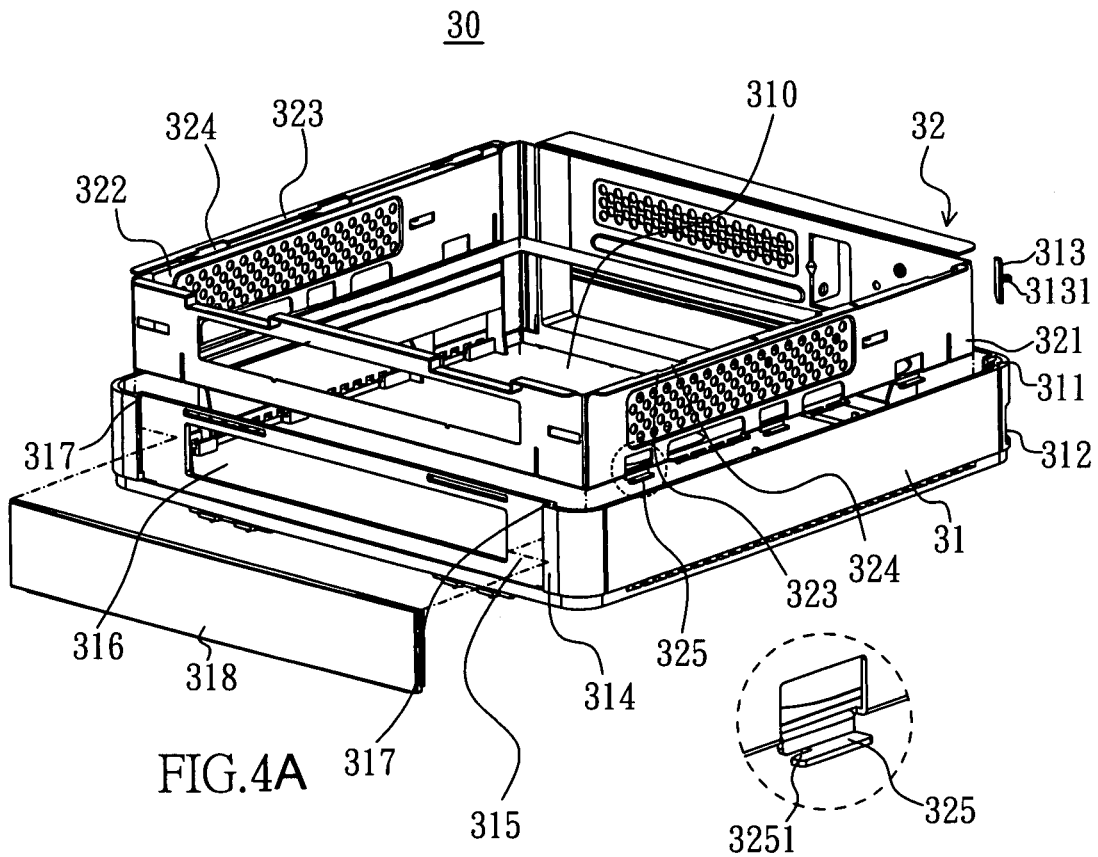
FIG. 4A is an exploded view, showing the third framework of a preferred embodiment according to the present invention.
FIG. 4B is an enlarged perspective view of the portion in the dashed circle in FIG. 4A.

Please referring to FIGS. 4A and 4B, the front side 314 of third outer frame 31 has a recess face 315 that has a through hole 316 and the two opposite lateral sides of the recess face 315 are respectively provided with a guiding groove 317. The two lateral sides of a shielding plate 318 are respectively placed in the guiding groove 317 to allow the shielding plate 318 to fit with the recess face 315 and to shield the through hole 316.

Figure 5:
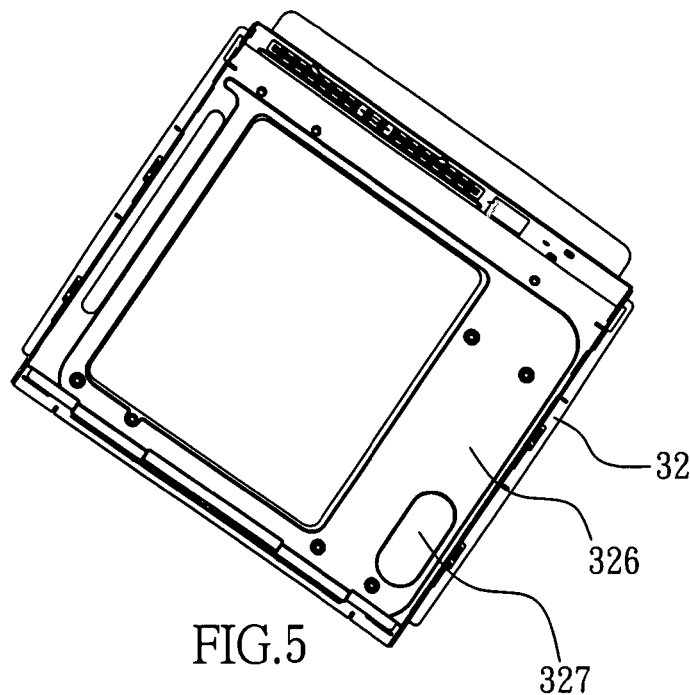
FIG. 5 is a top elevational view, showing the third inner frame of the preferred embodiment according to the present invention.

Please referring to FIG. 5, the front end of the bottom 326 of the third inner frame 32 provides a through hole 327 for allowing electric wires to pass through.

According to the embodiment of the present invention, the inner spaces of the second framework 20, the third framework 30, the fourth framework 40 and the fifth framework 50 are provided for accommodating electronic products such as a motherboard, DVD drive and hard drive. A through hole at a bottom of an inner frame can be used for communicating with the lower framework. Therefore, wires can be routed to each framework to facilitate all electronic devices. Such wires can be directly routed to the power supply of the first framework or the motherboard of the second framework. Wires are hidden in the outer frame of each framework thus they do not affect the entire modular computer design. The inner side of each framework provides a corresponding internal engaging structure which is hidden in the outer frame to cause the stackable modular personal computer to show a more consistent outward appearance.

Figure 6:
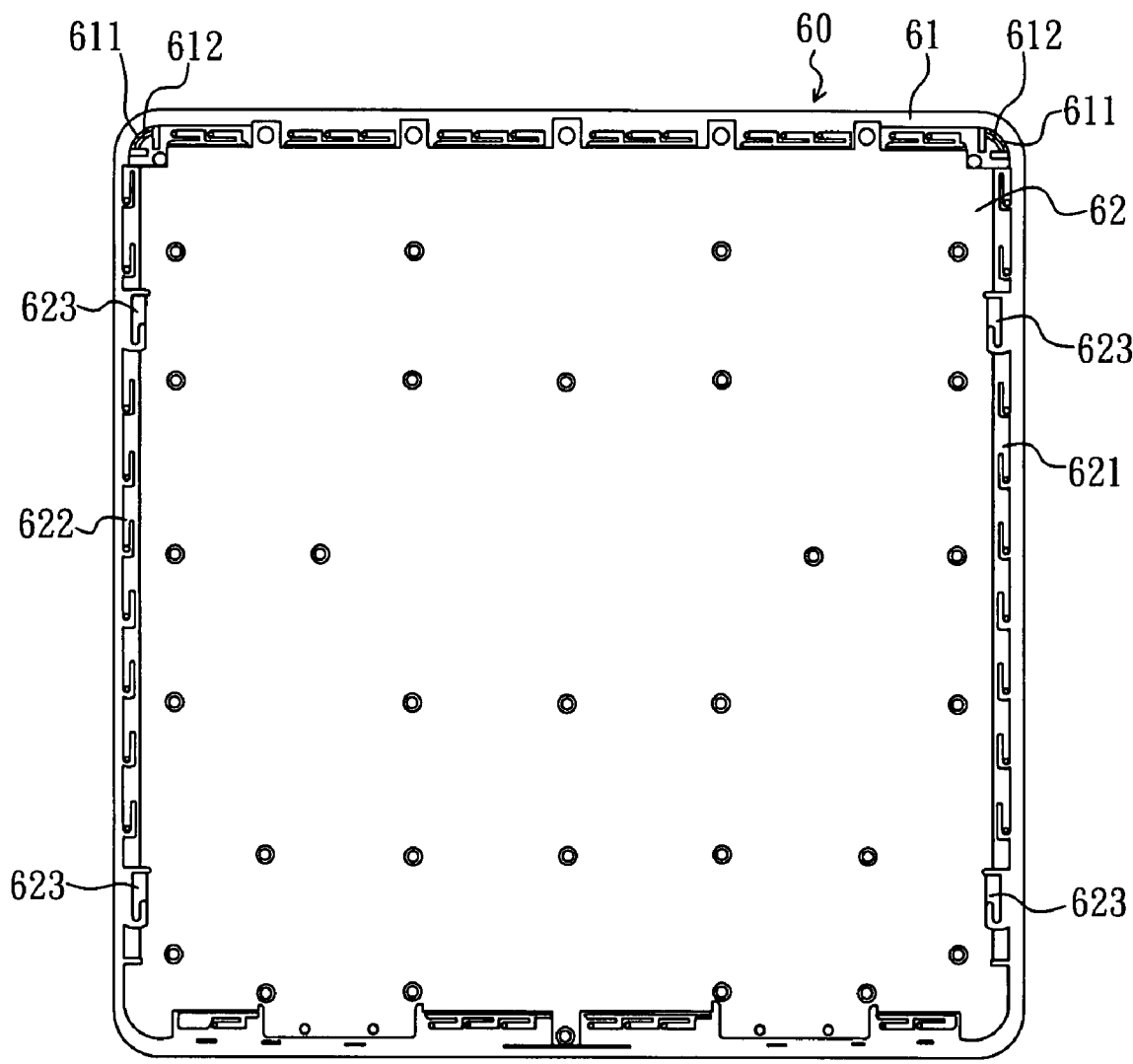
FIG. 6 is a bottom elevational view, showing the preferred embodiment according to the present invention of the upper cover.

Please referring to FIGS. 2 and 6, the upper cover 60 of the embodiment according to the present invention provides an internal engaging structure is almost the same as the internal engaging structure provided at the bottoms of the intermediate frameworks and the uppermost framework, and the internal engaging structure has a sixth inner frame 62 which is combined with an inner side of the sixth outer frame 61. A bottom of a rear end of the sixth outer frame 61 provides a slot 611 and a clasp-plate 612 respectively corresponding to the slot 312 and a clasp-plate 313 of the third outer frame 31 as shown in FIG. 4A. The two opposite lateral sides 621,622 of the sixth inner frame 62 provide a clasp-ear 623 respectively which corresponds to the two opposite lateral sides 321, 322 and the clasp-hole 324 of the prop-plate 323 of the third inner frame 32. The clasp-ear 623 and the clasp-plate 612 of the upper cover 60 are fastened to the corresponding clasp-hole and the second slot of the fifth framework 50 respectively, allowing the upper cover 60 to be combined with the fifth framework 50 firmly.

The present invention is provided for a stackable modular personal computer. Each inner frame has a hole for allowing at least one electric wire to pass through to enable the electric wires of the modular personal computer and a combination structure of each layer are all hidden in the frameworks so that an identical outlook can be obtained and it facilitates to assemble and combine each framework firmly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stackable modular personal computer structure, which is used for assembling an individualized computer, comprising a lowermost framework, an uppermost framework and a plurality of intermediate frameworks, all the frameworks being stacked to combine with each other in a sequence, each of the frameworks further comprising a first outer frame and a first inner frame respectively, wherein said first inner frame is joined to an inner side of said first outer frame, and said first outer and inner frames have an open top respectively for the frameworks to communicate with each other, each of said intermediate frameworks and said uppermost framework having a partly open bottom with a through hole specially adapted for electric wires passing through to enable the electric wire to be routed to each framework, the tops of inner sides of the lowermost and intermediate frameworks providing a first internal engaging structure at the outer and inner frames, the bottoms of inner sides of said intermediate frameworks and said uppermost framework providing a second internal engaging structure at the outer and inner frames respectively; whereby the frameworks are capable of combining with each other via the internal engaging structures;

wherein the first internal engaging structure includes a plurality of clasp-holes and first slots which are placed on the top ends of two opposite sides of said inner frame and on the top end of a rear side of said outer frame; said second internal engaging structure includes a plurality of first clasp-ears and second slots which are placed on the bottoms of the two opposite sides of said inner frame and the bottom of the rear side of said outer frame respectively; wherein, the second slots extend to the bottoms of said intermediate and uppermost frameworks; each of the second slots movably combines a first clasp-plate, wherein the first clasp-plate includes a first ear-plate extending to the outside of the corresponding second slot; whereby the first clasp-ear of said second internal engaging structure is fastened into the clasp-hole of said first internal engaging structure, and the ear-plate of said second internal engaging structure is pulled to drive a bottom of the first clasp-plate to extend under the second slot to be fastened into the first slot of said first internal engaging structure, which causes the frameworks to be combined together.

2. The stackable modular personal computer structure according to claim 1, wherein said first internal engaging structure further comprises a plurality of prop-plates disposed at the top ends of the two opposite lateral sides of the inner frame with each one of the prop-plates being next to each one of the clasp-holes respectively, and each of the prop-plates bending outward; each of the clasp-holes has a narrow front end with a crevice and a wider rear end for holding the first clasp-ears; each of the first clasp-ears includes a lug at a front end thereof to space apart a gap from the two opposite lateral sides of the inner frame respectively; whereby the lug is allowed to be fastened under the prop-plates of the second internal engaging structure respectively with the lug resting at the outside of the crevice.

3. The stackable modular personal computer structure according to claim 2, wherein the first and second slots are disposed at two junctions between the rear side and the two opposite lateral sides of the outer frame.

4. The stackable modular personal computer structure according to claim 3, wherein the first front side of the outer frame of at least one of the frameworks has a recess face with a through hole.

5. The stackable modular personal computer structure according to claim 4, wherein a guiding groove is respectively disposed on two opposite sides of the recess face; a shielding plate fits with said recess face with the two opposite lateral sides of said shielding plate being placed in the guiding grooves respectively.

6. The stackable modular personal computer structure according to claim 1, wherein an upper cover, which is disposed on top of and engages with the uppermost framework, is provided with the second internal engaging structure, at the bottom thereof, to correspond to the first internal engaging structure at the uppermost framework.

7. The stackable modular personal computer structure according to claim 1, wherein an underside of the lowermost framework is combined with a plurality of foot rests.

\* \* \* \* \*